US010505781B2

United States Patent
Chang et al.

(10) Patent No.: US 10,505,781 B2
(45) Date of Patent: Dec. 10, 2019

(54) FREQUENCY TRANSLATING BACKSCATTER MODULATOR WITH ENVELOPE CONTROL TO SUPPORT OFDM/QAM AND OTHER ENVELOPE MODULATED WIRELESS PROTOCOLS

(71) Applicants: THE REGENTS OF THE UNIVERSITY OF CALIFORNIA, Oakland, CA (US); CALIFORNIA INSTITUTE OF TECHNOLOGY, Pasadena, CA (US)

(72) Inventors: Mau-Chung Frank Chang, Los Angeles, CA (US); Adrian J. Tang, Pasadena, CA (US)

(73) Assignees: THE REGENTS OF THE UNIVERSITY OF CALIFORNIA, Oakland, CA (US); CALIFORNIA INSTITUTE OF TECHNOLOGY, Pasadena, CA (US)

(*) Notice: Subject to any disclaimer, the term of this patent is extended or adjusted under 35 U.S.C. 154(b) by 0 days.

(21) Appl. No.: 16/186,066

(22) Filed: Nov. 9, 2018

(65) Prior Publication Data

US 2019/0173728 A1    Jun. 6, 2019

Related U.S. Application Data

(63) Continuation of application No. PCT/US2017/031782, filed on May 9, 2017.
(Continued)

(51) Int. Cl.
*H04L 27/36* (2006.01)
*H04L 27/00* (2006.01)
(Continued)

(52) U.S. Cl.
CPC ........ *H04L 27/362* (2013.01); *H04L 27/0008* (2013.01); *H04L 27/2626* (2013.01); *H04L 27/2698* (2013.01); *H04L 27/34* (2013.01)

(58) Field of Classification Search
CPC ............. H04L 27/0008; H04L 27/2626; H04L 27/362; H04L 27/2698; H04L 27/34; G01S 13/758
See application file for complete search history.

(56) References Cited

U.S. PATENT DOCUMENTS

| 8,364,096 B2 | 1/2013 | Oota |
| 2007/0116015 A1* | 5/2007 | Jones .................. H03D 7/1441 370/396 |

(Continued)

FOREIGN PATENT DOCUMENTS

WO    2017222661    12/2017

OTHER PUBLICATIONS

ISA/US, United States Patent and Trademark Office (USPTO), International Search Report and Written Opinion dated Jan. 17, 2018, related PCT international application No. PCT/US2017/031782, pp. 1-11, claims searched, pp. 12-15.

*Primary Examiner* — Sung S Ahn
(74) *Attorney, Agent, or Firm* — O'Banion & Ritchey LLP; John P. O'Banion

(57) ABSTRACT

A backscatter modulator for providing low power wireless communications. The disclosed modulator provides phase control for discriminating backscatter from the antenna versus other objects. In addition, the disclosed backscatter modulator provides amplitude modulation so that the technique can provide a non-constant envelope which can provide an intentional imbalance to manipulate super-position to provide envelope control of the reflected signal, while still maintaining the frequency translation properties. The disclosed backscatter modulator thus allows compatibility with
(Continued)

QAM, OFDM and other non-constant envelope modulation schemes to be backscattered, while still supporting the frequency translation behavior.

20 Claims, 7 Drawing Sheets

Related U.S. Application Data

(60) Provisional application No. 62/335,890, filed on May 13, 2016.

(51) Int. Cl.
*H04L 27/34* (2006.01)
*H04L 27/26* (2006.01)

(56) References Cited

U.S. PATENT DOCUMENTS

| | | | |
|---|---|---|---|
| 2010/0080270 A1* | 4/2010 | Chen | H03F 1/223 |
| | | | 375/219 |
| 2015/0009018 A1 | 1/2015 | Manku | |

* cited by examiner

110

112

FREQUENCY TRANSLATING BACKSCATTER MODULATOR WITH ENVELOPE CONTROL TO SUPPORT OFDM/QAM AND OTHER ENVELOPE MODULATED WIRELESS PROTOCOLS

CROSS-REFERENCE TO RELATED APPLICATIONS

This application claims priority to, and is a 35 U.S.C. § 111(a) continuation of, PCT international application number PCT/US2017/031782 filed on Mar. 17, 1982, incorporated herein by reference in its entirety, which claims priority to, and the benefit of, U.S. provisional patent application Ser. No. 62/335,890 filed on May 13, 2016, incorporated herein by reference in its entirety. Priority is claimed to each of the foregoing applications.

The above-referenced PCT international application was published as PCT International Publication No. WO 2017/222661 on Dec. 28, 2017, which publication is incorporated herein by reference in its entirety.

STATEMENT REGARDING FEDERALLY SPONSORED RESEARCH OR DEVELOPMENT

The invention described herein was made in the performance of work under a NASA contract NNN12AA01C, and is subject to the provisions of Public Law 96-517 (35 USC 202) in which the Contractor has elected to retain title.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a backscatter modulator, and more particularly to a backscatter modulator which provides envelope control.

2. Background Discussion

One major concern in backscatter/reflective data links is that the illuminating source which is shined onto the reflector or backscatter module will give rise to unwanted and unmodulated reflections, often called "in-band blockers" from the illuminating signal being reflected by other objects within the signal path and operating environment (floor, ceiling, walls, and so forth). These in-band blockers are typically much stronger than the modulated signal from the backscatter or reflection modulator device and will desensitize the front-end receiver of the base-station or access point capturing the backscatter's or reflector's transmission.

FIG. 1 illustrates an approach utilized to overcome this RFID/WiFi backscatter by using a frequency translation technique where the termination condition of an antenna is modulated at a frequency internal to the reflection device. This "internal-carrier" creates a frequency translation at the antenna so the modulated reflection becomes offset by this frequency allowing a spectral separation between modulated and unmodulated reflections. A technique for this based on complementary code keying (CCK) has been demonstrated.

In the figure a wireless device (RFID) 12 is shown for communications with an access point (AP) 14. Carrier modulation 16 is shown from the AP to the responder device 12. Wireless device 12 is shown with an internal carrier 20, shown as being 200 MHz into a modulator 22 shown for dividing the input frequency and quadrature generation to generate four quadrature phases 24 (IQ) at 0, 90, 180 and 270 degrees. A multiplexer 26 is utilized to select, based on 2b symbol select signal 28, one 30 of these phase-shifted carriers to be applied to a switch 32 with modulates the termination condition of antenna 34, in communicating 36 the termination condition of antenna 34 to AP 14. The multiplexer 26 performs a symbol selection process allowing 1-of-n phases to be selected for reflection from the modulator back to the base-station or access point.

As an example, the figure depicts typical numbers for operation at 2.4 GHz where a 2.5 GHz illuminating source is used and a frequency translation of 100 MHz occurs to place the final reflected signal in the 2.4 GHz ISM band for WiFi operation.

Although this approach can avoid unmodulated reflections, yet it is not compatible with the numerous standards which require non-constant envelopes.

Accordingly, a need exists for a modulation technique which has wider applicability with existing protocols requiring non-constant envelopes. The present disclosure fulfills that need and provides additional wireless communication benefits.

BRIEF SUMMARY

This disclosure describes a modulator with envelope control (phase and amplitude modulation) that is able to backscatter, frequency translate and modulate both amplitude and phase, all within a single device.

The present disclosure overcomes the problems with approaches as seen in FIG. 1 which can overcome the backscatter issue, but that provide no amplitude control. Without amplitude control, the envelope of the reflected signal cannot be modulated, whereby only constant envelope schemes (QPSK, BPSK, 8PSK) can be utilized, thus significantly curtailing applicability to standards where amplitude control is required (e.g., 802.11a, g, n, ac, ad, ax, and so forth.).

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

The present disclosure overcomes numerous shortcomings of the prior approaches by providing amplitude control of the backscatter modulator.

Figure 1:
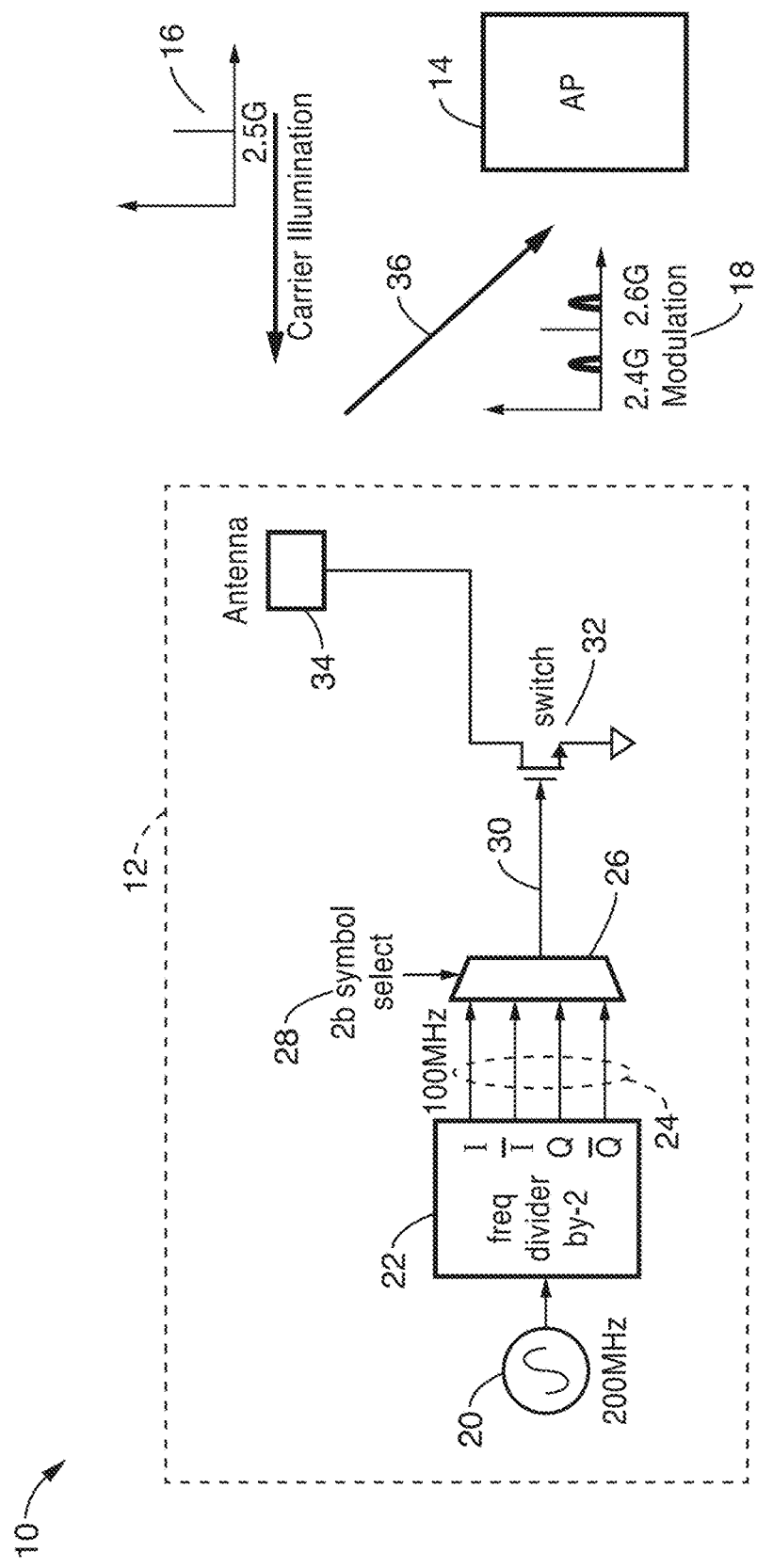
FIG. 1 is a block diagram of prior art frequency translation technique for backscatter or reflective data-links to avoid interference of unmodulated blockers through spectral separation.
Figure 2:
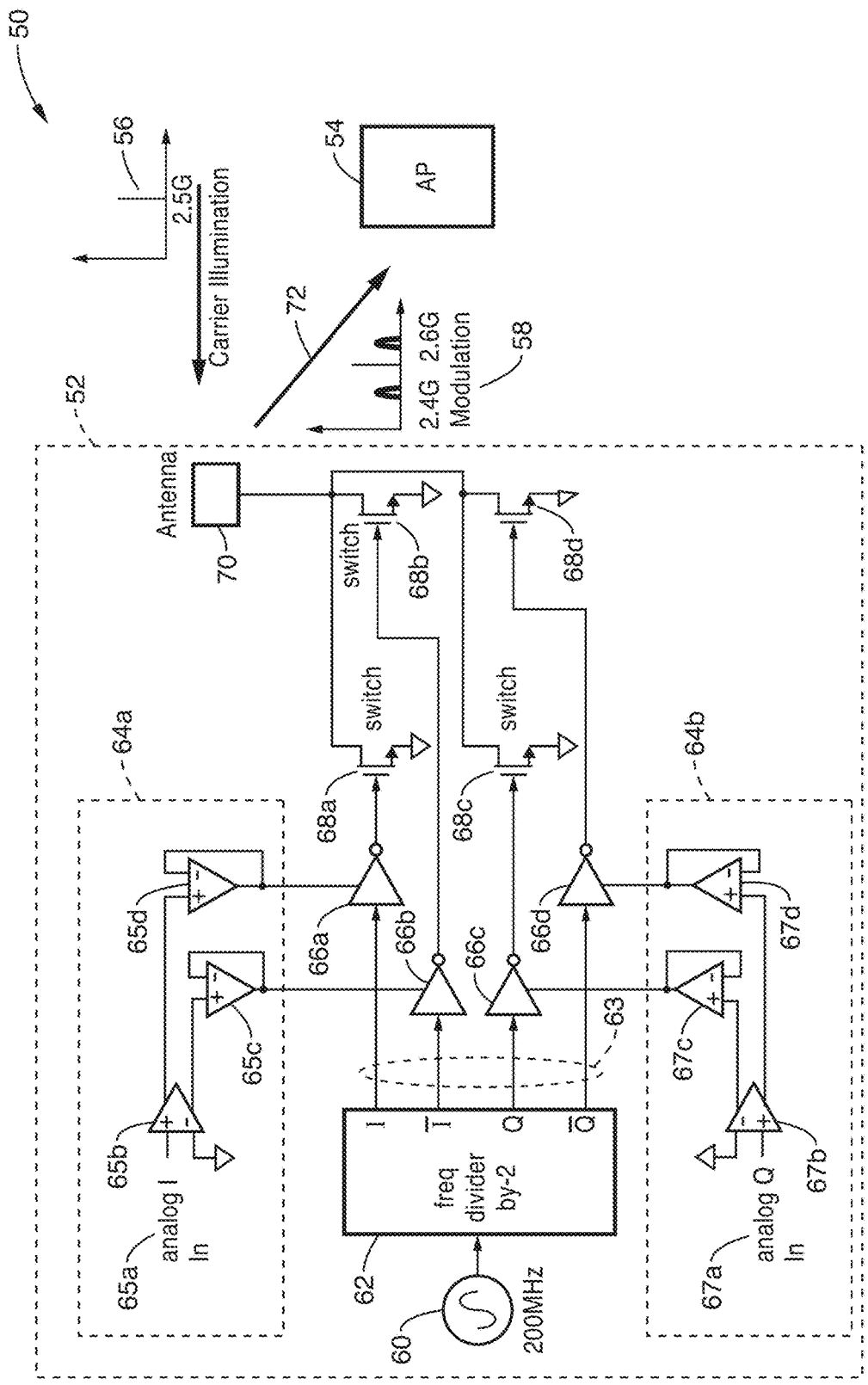
FIG. 2 is a block diagram of a frequency translating backscatter modulator with amplitude control to support QAM/OFDM and other envelope modulation schemes according to an embodiment of the present disclosure.

FIG. 2 illustrates an example embodiment 50 of a system utilizing the disclosed backscatter modulator circuit that overcomes amplitude control limitations found in conventional modulators.

Carrier modulation 56 at 2.5 GHz is shown from AP 54 to wireless device 52, with sidebands shown in element 58. Backscatter modulator device 52 is shown with an internal carrier 60, shown as being a 200 MHz signal into a modulator 62 shown for dividing the input frequency and quadrature generation to generate four quadrature phases 63 (I, Ī, Q, Q̄), in this example at 0, 90, 180 and 270 degrees. Two amplitude control circuits 64a, 64b are seen configured for receiving an analog control signal 65a, 67a, for controlling amplitudes of I and Q signals, such as through controlling driver circuits, as exemplified but not limited to controlling the power applied to CMOS inverter circuits 66a, 66b, 66c, and 66d. One of ordinary skill in the art will recognize that a number of drivers, circuits usable as drivers, and combinations of circuit elements, can be configured for receiving a signal to control output amplitude, wherein the instant application is not limited to the use of these specific amplitude control circuits. Also by way of example and not limitation, amplitude control circuits 64a, 64b are each shown comprising multiple amplifier circuits, such as depicted as a differential amplifier 65b, 67b, whose outputs are directed through unity gain amplifiers 65c, 65d, 67c, 67d. Output from these drivers is directed to control multiple switches, herein exemplified with four switches 68a, 68b, 68c, 68d, depicted by way of example and not limitation as MOSFET switches, whose outputs are coupled to antenna 70 to control antenna's termination condition, including both phase and amplitude.

In the embodiment shown, the four parallel switches (68a, 68b, 68c, 68d) provide termination of antenna 70 instead of using a single switch as found in conventional modulators. In this embodiment, each parallel switch is modulated with a different quadrature internal carrier phase (e.g., 0, 90, 180, 270 degrees), resulting in an antenna termination impedance that is the superposition of these four internal carrier phases.

By controlling the amplitude of each switching signal, imbalance can be created intentionally to manipulate this super-position to provide envelope control of the reflected signal, while still maintaining the frequency translation properties. This allows for QAM, OFDM and other non-constant envelope modulation schemes to be backscattered, while still supporting the frequency translation behavior.

Although the embodiment 50 of FIG. 2 alters the supply voltage of a CMOS-inverter to control carrier envelope, other implementations (e.g., mixer, variable gain amplifier/Programmable Gain Amplifier, or potentiometer based amplitude control) can be alternatively utilized for controlling carrier envelope by controlling the power supplied to the device or controlling a gain or similar input of the device. Also, it should be appreciated that the internal IQ carrier itself can be generated by different forms of circuitry as desired, such as by phase-lock-loop, synthesizer or frequency divider, or other methods known to those of ordinary skill in the art.

It will be appreciated that in contrast to conventional modulators, the modulator circuit described herein is able to backscatter, frequency translate and modulate both amplitude and phase, all with a single device. While conventional modulators may employ frequency translation (i.e., phase modulation only) for backscattering, no known modulator employs envelope control as is employed in the presented technology (phase modulation and amplitude modulation).

While phase only control for backscatter links as used in conventional modulators provides compatibility with 802.11b which supports CCK (Complementary Code Keying), it prohibits compatibility with other more popular WiFi standards. In contrast, a modulator according to the presented technology with amplitude and phase control allows the device to be implemented for all WiFi (11a, 11b, 11g, 11n, 11ac) standards. The modulator circuit presented herein allows backscatter link technology to support not only constant envelope modulation schemes, but also much more popular non-constant envelope schemes like 802.11.ac/802.11.a/g/n and upcoming 802.11.ax.

It will be appreciated that the presented technology is particularly well-suited for the wireless connectivity market: WLAN, WiFi, Bluetooth, and Cellular. Other possible applications exist for mm-wave standards like 802.11.ad and 802.15.3c. Lower frequency applications may also exist for UHF and the pager band (433 MHz). Additionally, the technology might even play some role in the upcoming 5G cellular standard (possibly at 15 or even 30 GHz).

The disclosed technology has been implemented for testing, with the modulator and baseband symbol generator co-integrated into a single CMOS chip which was directly wire-bonded to a PCB module. The PCB contains an antenna tuned to the desired frequency band (e.g., 6.7 GHz) as well as several support components including: (a) a USB-to-SPI converter to control coefficients and static symbols settings, (b) power regulator(s), and SMA connectors (SubMiniature version A connectors—which are semi-precision coaxial RF connectors) to feed in the external clock used to derive the internally generated quadrature offset LO. The antenna utilized may be of any desired form. The base-station setup used to characterize the backscatter modulator was implemented with a signal generator tuned to 6.7 GHz and providing 23 dBm of power to a large WiFi panel antenna (approximately 15 dBi of gain). Similarly, a base-station receiver was formed with an identical panel antenna and LNA providing 30 dB of gain and a noise figure of 5.5 dB at 6.9 GHz. The output of the low-noise amplifier (LNA) was fed directly into a vector signal analyzer (e.g., Keysight MXA9020n) to capture the time domain signals and extract the constellations produced by an implementation of the disclosed backscatter transmitter device.

For testing the backscatter transmitter device, a simulated base-station was created with two panel antennas for Tx and Rx illuminating with 23 dBm of power and offering a receiver noise figure of 5.5 dB. The reflector chip was placed 50 cm away from the base-station and illuminated with a 6.7 GHz CW signal from the transmitter. The clock of the chip was set to 800 MHz, providing an offset carrier of 200 MHz, meaning that the reflected signal captured by the receiver will be centered at 6.7+0.2=6.9 GHz. It should be noted that another sideband does exist at 6.7−0.2=6.5 GHz; however, this sideband is ignored during our characterization and outside of the programmed channel bandwidth of the MXA signal analyzer. It should be appreciated that FIG. 2 depicts a previous implementation at 2.5 GHz.

To begin characterization, the clock divider was first set to provide a data rate of 12.5 Mb/s and capture the backscattered signal when the static symbols are set to their ideal cases for a simple QPSK constellation: (255,255), (0,0), (0,255), (255,0). Additionally, all the pulse-shaping coefficients were set to 0 so that only the raw ideal QPSK symbols are being backscattered to the base-station.

Figure 3A:
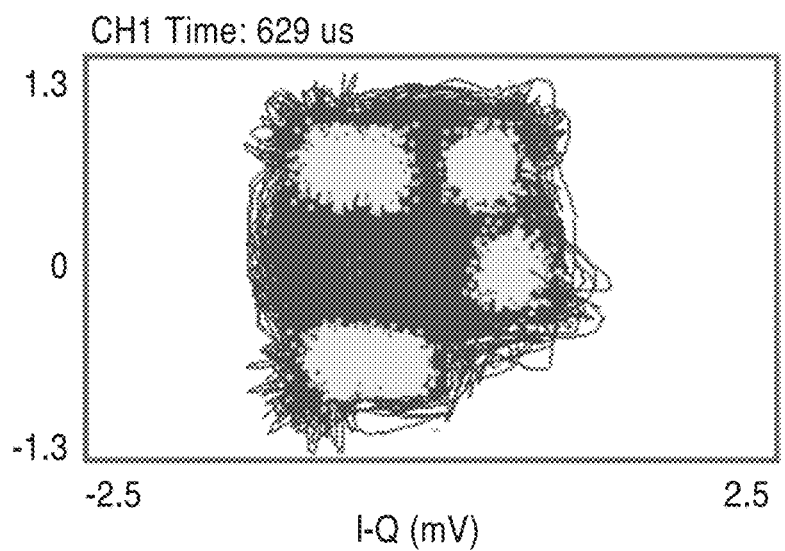
FIG. 3A through FIG. 3D are waveforms obtained from backscatter testing at 12.5 Mb/s according to an embodiment of the present disclosure.
Figure 3B:
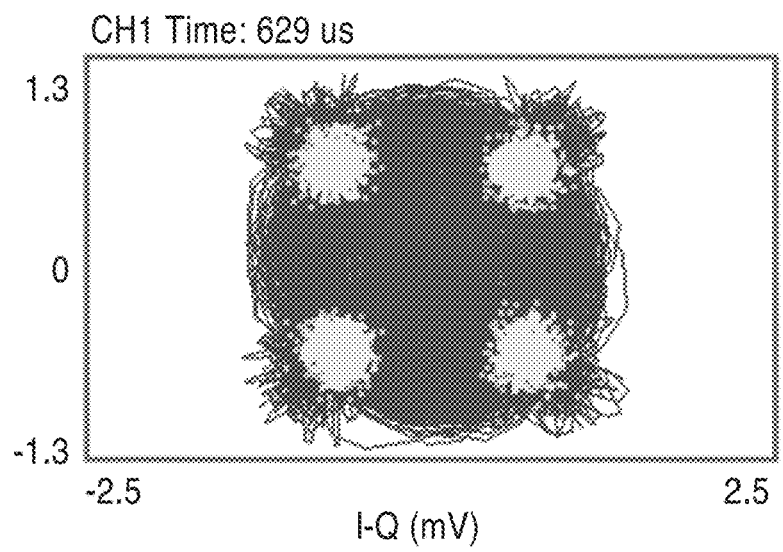
Figure 3C:
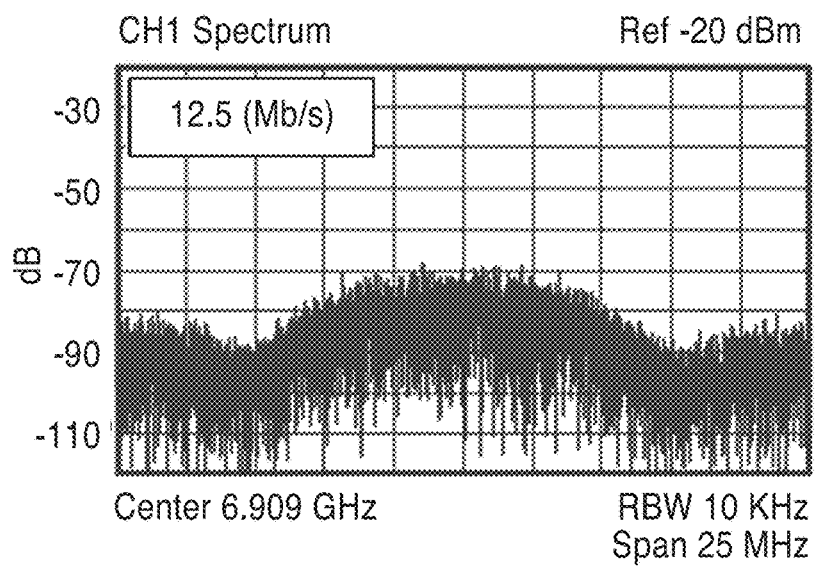
Figure 3D:
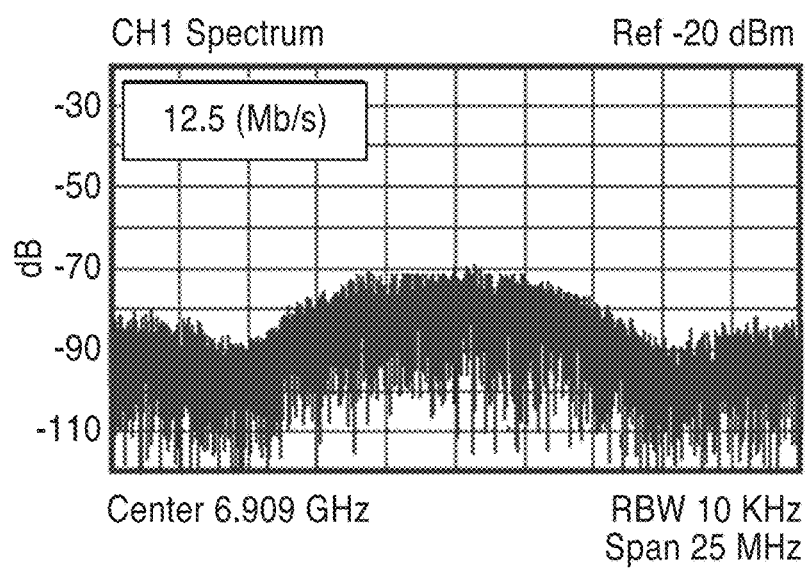

FIG. 3A through FIG. 3D illustrate results from this testing at a rate of 12.5 Mb/s captured at the receiver with and without the pre-distortion (PD) and pulse-shape (PS) filters. FIG. 3A (90) and FIG. 3C (94) depict results for the raw symbols and FIG. 3B (92) and FIG. 3D (96) for PD/PS optimized according to the present disclosure. It will be noted that constellation integrity is not lost as four symbols are clearly visible in the results. Although FIG. 3A does not depict a "nice" constellation with four equally spaced and uniformly distributed points, there are still four distinct clusters so the system can still "function" prior to predistortion, but would not function well. The EVM of FIG. 3A is quite high at approximately 40%, which is determined by estimating the error in position of each cluster relative to their ideal position. In contrast to the above, FIG. 3B shows results for the present disclosure depicting four distinct clusters which are equally spaced and uniformly distributed. Using the same data-rate static symbols and pulse-shape filters were adjusted while observing the measured EVM until it was minimized.

Figure 4:
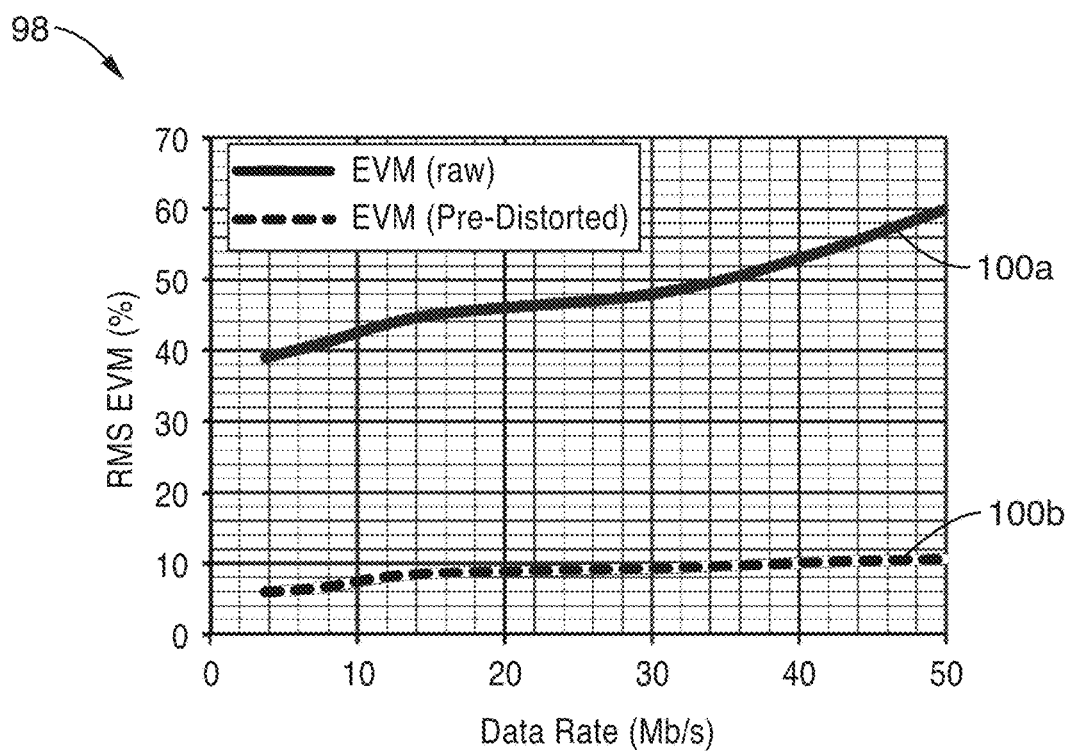
FIG. 4 is a plot of RMS error vector magnitude (EVM) for raw symbols and pre-distortion filtering as utilized according to an embodiment of the present disclosure.
Figure 5A:
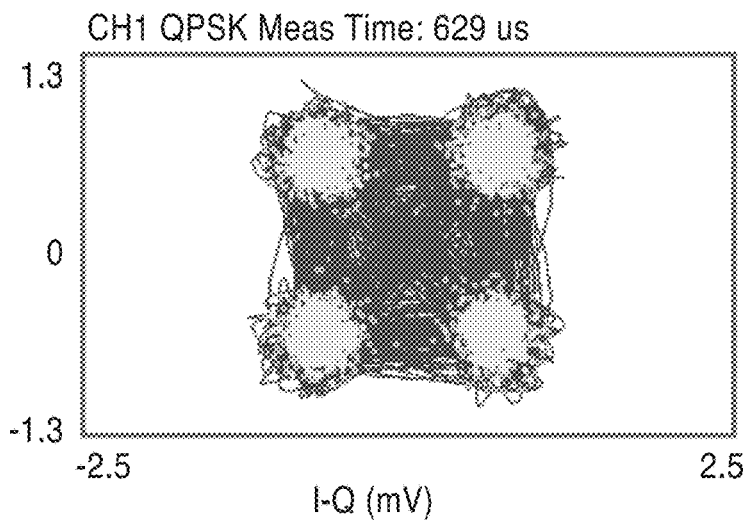
FIG. 5A through FIG. 5D are waveforms obtained from backscatter testing at 6.25 Mb/s and 50 Mb/s according to an embodiment of the present disclosure.
Figure 5B:
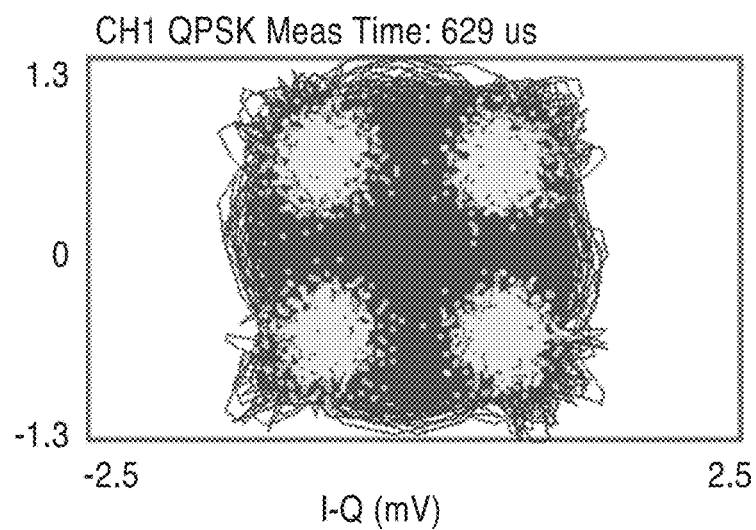
Figure 5C:
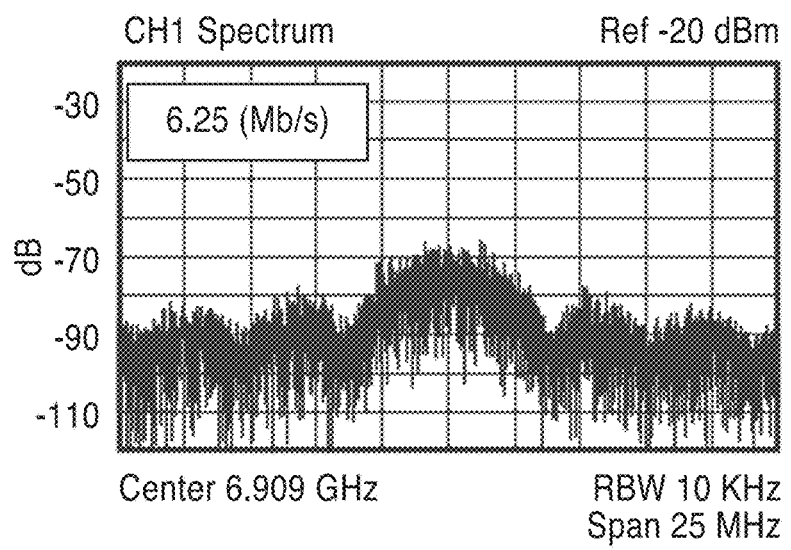
Figure 5D:
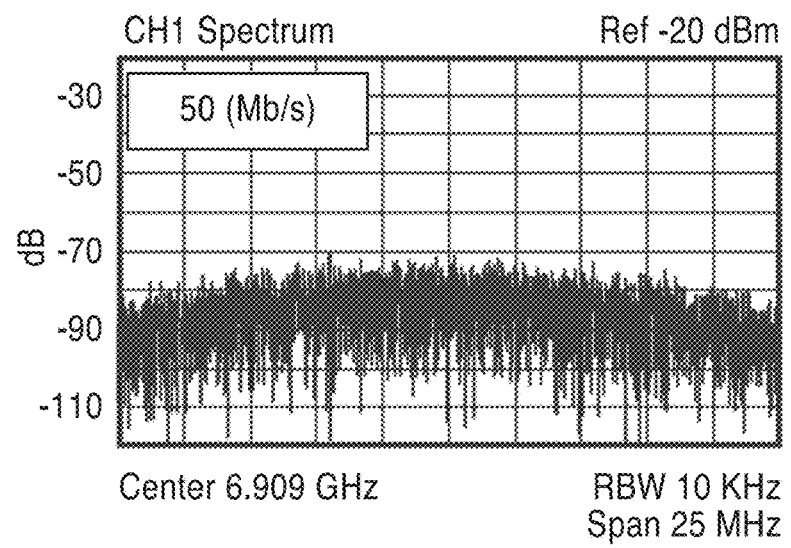

FIG. 4 illustrates results 98 showing error vector magnitude versus data rate for the backscattered QPSK constellation shown with EVM in the raw mode 100*a* (without pre-distortion filtering), and with EVM pre-distortion filtering enabled 100b is not enabled. This figure depicts repeating the measurement at multiple data rates, with RMS error vector magnitude (EVM) being plotted for the QPSK constellation at each data-rate before and after the coefficients and static symbol values are optimized. The figure depicts a dramatic improvement in EVM using the pre-distortion filtering, in particular this is seen at the higher data rates.

In all measurement cases of the constellation EVM, the signal-to-noise (SNR) received was in the range of 15 to 18 dB. While conceptually the demonstrated approach could be extended to more complex IQ constellations (16 QAM, 64 QAM, . . . ), the SNR is somewhat limited for reliable communication with so many constellation points. Additionally, the bit-depth of the DACs and pulse-shaping/predistorter blocks would need to increase, inflating power consumption.

FIG. 5A through FIG. 5D illustrate results from this testing at additional data rates of 6.25 Mb/s (FIG. 5A 110, FIG. 5C 114), and for a rate of 50 Mb/s (FIG. 5B 112, FIG. 5D 116) captured at the receiver.

In the prototype chip, each block can be powered up and down by digital enable signals controlled externally through the SPI interface. In order to measure the DC power of each block, the circuits were engaged one by one and the power recorded. These measured powers are tabulated in Table 1.

The overall backscatter transmitter consumes 2.6 mW, however, this power includes 0.5 mW for a PRBS that would not be included within a deployed system as a data stream would originate from outside the transmitter.

The present disclosure demonstrates an embodiment of a CMOS backscatter transmitter providing QPSK signaling at 6.7 GHz. The demonstrated transmitter avoids jamming or blocking from unmodulated reflections by employing an offset carrier approach where the reflected signal is offset in frequency from the incident CW power. This offset carrier concept was extended into quadrature-amplitude modulation (QAM) where both amplitude and phase can be selected (and modified) for each transmitted symbol. Use of an analog input to the modulator section of the transmitter allows for digital baseband techniques to provide pulse-shaping and pre-distortion to improve link error vector magnitude (EVM). These improvements were validated by direct EVM measurements at several data rates using a base-station implemented with lab equipment and transmission over 50 cm distance. The demonstrated transmitter consumes 2.6 mW and occupies a small silicon area of 1.96 mm$^2$ in TSMC 65 nm CMOS technology, making it well-suited for use in IoT devices where power and form factor resources are limited.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. A frequency translating backscatter modulator apparatus, comprising: (a) a frequency divider configured with multiple carrier phase outputs; (b) multiple amplitude control circuits, with each amplitude control circuit coupled for receiving one of said multiple carrier phase outputs and modulating its amplitude in response to receipt of an envelope control signal as received from multiple envelope control signals, and outputting an amplitude modulated switching control signal; and (c) multiple antenna termination switches, each of which is configured for having its switching state controlled in response to receiving one of said amplitude modulated switching control signals from said multiple amplitude control circuits; (d) wherein each of said multiple antenna switches is connected in parallel and configured for connection to an antenna so that antenna termination impedance comprises superposition of these multiple carrier phases from said multiple carrier phase outputs, and amplitude control from said envelope control signals.

2. The apparatus of any preceding embodiment, wherein said multiple carrier phase outputs comprise quadrature internal carrier phases.

3. The apparatus of any preceding embodiment, wherein said envelope control signal comprises a constant or a non-constant envelope modulation scheme.

4. The apparatus of any preceding embodiment, wherein said non-constant envelope modulation scheme comprises QAM or OFDM.

5. The apparatus of any preceding embodiment, wherein said non-constant envelope modulation scheme comprises 802.1, 802.11ac, 802.11a, 802.11g, 802.11n or 802.11.ax.

6. The apparatus of any preceding embodiment, wherein said envelope control signal comprises an I signal and a Q signal for a QAM modulation technique.

7. The apparatus of any preceding embodiment, wherein each of said multiple amplitude control circuits is selected from the group of amplitude controlled output circuit consisting of inverters, mixers, variable gain amplifiers, programmable gain amplifiers, and potentiometer based amplitude control circuits.

8. The apparatus of any preceding embodiment, wherein by controlling amplitude of each said amplitude control circuit are configured to control on resistance of said multiple antenna termination switches to create intentional imbalance to manipulate super-position to provide envelope control of a reflected signal from said antenna, while maintaining frequency translation properties.

9. The apparatus of any preceding embodiment, wherein said apparatus is configured for use with wireless communication devices selected from the group of wireless devices consisting of WLAN, WiFi, Bluetooth, Cellular, 802.11 and 802.15 standards, UHF bands, pager bands, and 5G cellular standards.

10. A frequency translating backscatter modulator apparatus, comprising: (a) a frequency divider configured with multiple carrier phase outputs comprising quadrature internal carrier phases; (b) multiple amplitude control circuits, with each amplitude control circuit coupled for receiving one of said multiple carrier phase outputs and modulating its amplitude in response to receipt of an envelope control signal as received from multiple envelope control signals, and outputting an amplitude modulated switching control signal; (c) wherein each of said multiple envelope control signal comprises a constant or a non-constant envelope modulation scheme; and (d) multiple antenna termination switches, each of which is configured for having its switching state controlled in response to receiving one of said amplitude modulated switching control signals from said multiple amplitude control circuits; (e) wherein each of said multiple antenna switches is connected in parallel and configured for connection to an antenna so that antenna termination impedance comprises superposition of these multiple carrier phases from said multiple carrier phase outputs, and amplitude control from said envelope control signals.

11. The apparatus of any preceding embodiment, wherein said non-constant envelope modulation scheme comprises QAM or OFDM.

12. The apparatus of any preceding embodiment, wherein said non-constant envelope modulation scheme comprises 802.1, 802.11ac, 802.11a, 802.11g, 802.11n or 802.11.ax.

13. The apparatus of any preceding embodiment, wherein said envelope control signal comprises an I signal and a Q signal for a QAM modulation technique.

14. The apparatus of any preceding embodiment, wherein each of said multiple amplitude control circuits is selected from the group of amplitude controlled output circuit consisting of inverters, mixers, variable gain amplifiers, programmable gain amplifiers, and potentiometer based amplitude control circuits.

15. The apparatus of any preceding embodiment, wherein said apparatus is configured for use with wireless communication devices selected from the group of wireless devices consisting of WLAN, WiFi, Bluetooth, Cellular, 802.11 and 802.15 standards, UHF bands, pager bands, and 5G cellular standards.

16. A method of frequency translating backscatter modulation, comprising: (a) dividing an incoming frequency and generating multiple carrier phase outputs; (b) controlling termination impedance of an antenna in response to switching of multiple switches coupled in parallel to the antenna, with the switching state of each switch controlled in response to receiving one of said multiple carrier phase outputs; (c) generating amplitude modulated switching control signals from a control circuit of multiple control circuits in response to receiving an envelope control signal from multiple envelope control signals; (d) controlling amplitude output of each switch in response to receiving amplitude modulated switching control signals at a power supply or gain input of each said switch; and (e) wherein termination impedance of the antenna comprises superposition of these multiple carrier phases from said multiple carrier phase outputs, and amplitude control from said multiple envelope control signals.

17. The method of any preceding embodiment, wherein said multiple carrier phase outputs comprise quadrature internal carrier phases.

18. The method of any preceding embodiment, wherein said multiple envelope control signals are comprising a constant or a non-constant envelope modulation scheme.

19. The method of any preceding embodiment, wherein said non-constant envelope modulation scheme comprises QAM or OFDM.

20. The method of any preceding embodiment, wherein said non-constant envelope modulation scheme comprises 802.1, 802.11ac, 802.11a, 802.11g, 802.11n or 802.11.ax.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Power Breakdown of Key Circuit Blocks | |
|---|---|
| Circuit Block | Power Use (mW) |
| PRBS Generator (testing tool - not part of invention) | 0.51 |
| Pre-Distorter/Pulse Shaper | 0.99 |
| IQ LO Generators (Divider 62 in FIG. 2) | 0.60 |
| Front-End Modulator Circuitry | 0.47 |

What is claimed is:

1. A frequency translating backscatter modulator apparatus, comprising:
   a frequency divider configured with multiple carrier phase outputs;
   multiple amplitude control circuits, with each amplitude control circuit coupled for receiving one of said multiple carrier phase outputs and modulating its amplitude in response to receipt of an envelope control signal as received from multiple envelope control signals, and outputting an amplitude modulated switching control signal; and
   multiple antenna termination switches, each of which is configured for having its switching state controlled in response to receiving one of said amplitude modulated switching control signals from said multiple amplitude control circuits;
   wherein each of said multiple antenna switches is connected in parallel and configured for connection to an antenna so that antenna termination impedance comprises superposition of multiple carrier phases from said multiple carrier phase outputs, and amplitude control from said multiple envelope control signals.

2. The apparatus of claim 1, wherein said multiple carrier phase outputs comprise quadrature internal carrier phases.

3. The apparatus of claim 1, wherein said envelope control signal comprises a constant or a non-constant envelope modulation scheme.

4. The apparatus of claim 3, wherein said non-constant envelope modulation scheme comprises QAM or OFDM.

5. The apparatus of claim 3, wherein said non-constant envelope modulation scheme comprises 802.1, 802.11ac, 802.11a, 802.11g, 802.11n or 802.11.ax.

6. The apparatus of claim 3, wherein said envelope control signal comprises an I signal and a Q signal for a QAM modulation technique.

7. The apparatus of claim 1, wherein each of said multiple amplitude control circuits is selected from the group of amplitude controlled output circuit consisting of inverters, mixers, variable gain amplifiers, programmable gain amplifiers, and potentiometer based amplitude control circuits.

8. The apparatus of claim 1, wherein by controlling amplitude of each said amplitude control circuit are configured to control on resistance of said multiple antenna termination switches to create intentional imbalance to manipulate super-position to provide envelope control of a reflected signal from said antenna, while maintaining frequency translation properties.

9. The apparatus of claim 1, wherein said apparatus is configured for use with wireless communication devices selected from the group of wireless devices consisting of WLAN, WiFi, Bluetooth, Cellular, 802.11 and 802.15 standards, UHF bands, pager bands, and 5G cellular standards.

10. A frequency translating backscatter modulator apparatus, comprising:
    a frequency divider configured with multiple carrier phase outputs comprising quadrature internal carrier phases;
    multiple amplitude control circuits, with each amplitude control circuit coupled for receiving one of said multiple carrier phase outputs and modulating its amplitude in response to receipt of an envelope control signal as received from multiple envelope control signals, and outputting an amplitude modulated switching control signal;
    wherein each of said multiple envelope control signals comprises a constant or a non-constant envelope modulation scheme; and multiple antenna termination switches, each of which is configured for having its switching state controlled in response to receiving one of said amplitude modulated switching control signals from said multiple amplitude control circuits;

wherein each of said multiple antenna switches is connected in parallel and configured for connection to an antenna so that antenna termination impedance comprises superposition of these multiple carrier phases from said multiple carrier phase outputs, and amplitude control from said envelope control signals.

11. The apparatus of claim 10, wherein said non-constant envelope modulation scheme comprises QAM or OFDM.

12. The apparatus of claim 10, wherein said non-constant envelope modulation scheme comprises 802.1, 802.11ac, 802.11a, 802.11g, 802.11n or 802.11.ax.

13. The apparatus of claim 10, wherein said envelope control signal comprises an I signal and a Q signal for a QAM modulation technique.

14. The apparatus of claim 10, wherein each of said multiple amplitude control circuits is selected from the group of amplitude controlled output circuit consisting of inverters, mixers, variable gain amplifiers, programmable gain amplifiers, and potentiometer based amplitude control circuits.

15. The apparatus of claim 10, wherein said apparatus is configured for use with wireless communication devices selected from the group of wireless devices consisting of WLAN, WiFi, Bluetooth, Cellular, 802.11 and 802.15 standards, UHF bands, pager bands, and 5G cellular standards.

16. A method of frequency translating backscatter modulation, comprising:

dividing an incoming frequency and generating multiple carrier phase outputs;

controlling termination impedance of an antenna in response to switching of multiple switches coupled in parallel to the antenna, with the switching state of each switch controlled in response to receiving one of said multiple carrier phase outputs;

generating amplitude modulated switching control signals from a control circuit of multiple control circuits in response to receiving an envelope control signal from multiple envelope control signals;

controlling amplitude output of each switch in response to receiving amplitude modulated switching control signals at a power supply or gain input of each said switch; and wherein termination impedance of the antenna comprises superposition of these multiple carrier phases from said multiple carrier phase outputs, and amplitude control from said multiple envelope control signals.

17. The method of claim 16, wherein said multiple carrier phase outputs comprise quadrature internal carrier phases.

18. The method of claim 16, wherein said multiple envelope control signals are comprising a constant or a non-constant envelope modulation scheme.

19. The method of claim 18, wherein said non-constant envelope modulation scheme comprises QAM or OFDM.

20. The method of claim 18, wherein said non-constant envelope modulation scheme comprises 802.1, 802.11ac, 802.11a, 802.11g, 802.11n or 802.11.ax.

* * * * *